US009306924B2

(12) United States Patent
Lehmann

(10) Patent No.: US 9,306,924 B2
(45) Date of Patent: Apr. 5, 2016

(54) SYSTEM FOR PERSONALIZED TELEMATIC SERVICES

(71) Applicant: Harman Becker Automotive Systems GmbH, Karlsbad (DE)

(72) Inventor: Dirk Lehmann, Ulm (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 14/039,503

(22) Filed: Sep. 27, 2013

(65) Prior Publication Data

US 2014/0096217 A1 Apr. 3, 2014

(30) Foreign Application Priority Data

Sep. 28, 2012 (EP) .................................... 12006776

(51) Int. Cl.
*H04L 29/06* (2006.01)
*H04W 12/06* (2009.01)
*H04W 4/00* (2009.01)
*H04W 4/22* (2009.01)
*H04W 12/04* (2009.01)

(52) U.S. Cl.
CPC ............ *H04L 63/08* (2013.01); *H04L 63/0853* (2013.01); *H04L 63/102* (2013.01); *H04W 12/06* (2013.01); *H04W 4/008* (2013.01); *H04W 4/22* (2013.01); *H04W 12/04* (2013.01)

(58) Field of Classification Search
CPC ... H04L 63/08; H04L 63/0853; H04L 63/102; H04W 12/06; H04W 4/008; H04W 4/22
USPC ..................................... 726/7; 701/29.1, 31.4
See application file for complete search history.

(56) References Cited

U.S. PATENT DOCUMENTS

| 6,490,513 | B1* | 12/2002 | Fish ..................... G07C 5/008 340/439 |
| 6,654,883 | B1* | 11/2003 | Tatebayashi ....... G06Q 20/3674 380/282 |
| 7,228,420 | B2* | 6/2007 | Dabbish .............. B60R 16/0234 340/425.5 |
| 9,002,536 | B2* | 4/2015 | Hatton .................... B60R 25/24 340/426.13 |
| 2003/0031184 | A1* | 2/2003 | Cunetto .............. H04L 12/2856 370/395.2 |
| 2003/0051016 | A1* | 3/2003 | Miyoshi ................. H04L 29/06 709/222 |
| 2003/0212895 | A1* | 11/2003 | Kisliakov ............... G06K 19/07 713/185 |
| 2004/0185842 | A1* | 9/2004 | Spaur ..................... B60R 25/04 455/420 |

(Continued)

FOREIGN PATENT DOCUMENTS

WO    WO 2010/045554 A1    4/2010

OTHER PUBLICATIONS

European Search Report dated Feb. 20, 2013, pp. 1-3, European Patent Application No. 12 006 766.4-1853, European Patent Office, Rijswijk, Netherlands.

*Primary Examiner* — David Garcia Cervetti
(74) *Attorney, Agent, or Firm* — Alleman Hall McCoy Russell & Tuttle LLP

(57) ABSTRACT

A telematics system can provide authenticated access to telematic services. Upon connection of a mobile communication device to an automotive telematic system, and receipt of a request to access a telematic service, the system can determine by a processing unit of the automotive telematic system whether a personalized key for user authentication is required to access the telematic service and, if it is determined that the personalized key is required, request the personalized key from the mobile communication device.

18 Claims, 4 Drawing Sheets

(56) References Cited

U.S. PATENT DOCUMENTS

| | | | |
|---|---|---|---|
| 2005/0107673 A1* | 5/2005 | Ball | A61B 5/411 600/301 |
| 2005/0114896 A1* | 5/2005 | Hug | H04N 7/17309 725/88 |
| 2005/0167172 A1* | 8/2005 | Fernandez | B60L 1/00 180/65.8 |
| 2006/0053009 A1* | 3/2006 | Jeong | G10L 15/30 704/234 |
| 2006/0100749 A1* | 5/2006 | Feilen | G06F 21/572 701/1 |
| 2006/0131412 A1* | 6/2006 | O'Brien | G07C 9/00103 235/451 |
| 2006/0189382 A1* | 8/2006 | Muir | G07F 17/32 463/29 |
| 2006/0190984 A1* | 8/2006 | Heard | H04L 63/102 726/1 |
| 2006/0236363 A1* | 10/2006 | Heard | H01L 63/101 726/1 |
| 2006/0258377 A1* | 11/2006 | Economos | H04L 12/189 455/461 |
| 2006/0265217 A1* | 11/2006 | Bicego | G10L 15/22 704/231 |
| 2007/0162760 A1* | 7/2007 | Samuelsson | G06F 21/6227 713/182 |
| 2007/0299565 A1* | 12/2007 | Oesterling | G07C 5/008 701/1 |
| 2008/0016004 A1* | 1/2008 | Kurasaki | G06Q 20/04 705/67 |
| 2008/0101613 A1* | 5/2008 | Brunts | G06F 21/572 380/279 |
| 2008/0125084 A1* | 5/2008 | Cambois | H04W 88/02 455/411 |
| 2008/0150683 A1* | 6/2008 | Mikan | G07C 9/00309 340/5.31 |
| 2008/0252412 A1* | 10/2008 | Larsson | B60R 25/25 340/5.2 |
| 2009/0254971 A1* | 10/2009 | Herz | G06Q 10/10 726/1 |
| 2009/0309697 A1* | 12/2009 | Miller | B60R 25/24 340/5.25 |
| 2010/0040234 A1* | 2/2010 | Alrabady | H04L 9/321 380/278 |
| 2010/0097178 A1* | 4/2010 | Pisz | B60R 16/037 340/5.72 |
| 2010/0105322 A1* | 4/2010 | Bertin | G06F 21/35 455/41.1 |
| 2010/0319066 A1* | 12/2010 | Berry | G06F 21/34 726/20 |
| 2011/0064222 A1* | 3/2011 | Wiseman | H04L 9/0827 380/255 |
| 2011/0112969 A1* | 5/2011 | Zaid | G06Q 10/02 705/50 |
| 2011/0169654 A1* | 7/2011 | Ketari | G08B 13/1427 340/687 |
| 2011/0213968 A1* | 9/2011 | Zhang | H04L 63/20 713/158 |
| 2012/0045058 A1* | 2/2012 | Weghaus | B60R 25/24 380/270 |
| 2012/0110345 A1* | 5/2012 | Pigeon | H04L 63/0435 713/189 |
| 2012/0130838 A1* | 5/2012 | Koh | G06Q 20/352 705/26.1 |
| 2012/0155636 A1* | 6/2012 | Muthaiah | H04L 9/0825 380/44 |
| 2012/0159170 A1* | 6/2012 | Lee | H04W 12/02 713/169 |
| 2012/0166309 A1* | 6/2012 | Hwang | G06Q 30/0613 705/26.41 |
| 2012/0284413 A1* | 11/2012 | Miura | G06F 21/445 709/227 |
| 2013/0110936 A1* | 5/2013 | Miura | H04W 12/08 709/204 |
| 2013/0173112 A1* | 7/2013 | Takahashi | H04L 9/0894 701/36 |
| 2013/0179029 A1* | 7/2013 | Wang | H04L 65/4092 701/32.7 |
| 2013/0194068 A1* | 8/2013 | Monig | B60R 25/24 340/5.61 |
| 2013/0259232 A1* | 10/2013 | Petel | H04L 63/0492 380/270 |
| 2013/0293349 A1* | 11/2013 | Templ | G07C 9/00111 340/5.61 |
| 2014/0032045 A1* | 1/2014 | Smirnov | H04L 67/12 701/36 |
| 2014/0037092 A1* | 2/2014 | Bhattacharya | G07C 9/00174 380/259 |
| 2014/0049366 A1* | 2/2014 | Vasquez | G07C 9/00857 340/5.54 |
| 2014/0079217 A1* | 3/2014 | Bai | H04L 63/0869 380/270 |
| 2014/0270158 A1* | 9/2014 | Peirce | H04L 9/0819 380/44 |
| 2014/0359655 A1* | 12/2014 | Diehl | H04N 21/2146 725/31 |
| 2015/0161832 A1* | 6/2015 | Esselink | G07C 9/00015 340/5.22 |

* cited by examiner

SYSTEM FOR PERSONALIZED TELEMATIC SERVICES

BACKGROUND OF THE INVENTION

1. Priority Claim

This application claims the benefit of priority from EP 12 006 776.4, filed Sep. 28, 2012, which is incorporated by reference.

2. Technical Field

The present invention relates to a system for providing a secure and personalized access to telematic services, such as infotainment or navigation services, of an automotive telematic system.

3. Related Art

Since its introduction in 1978 by Simon Nora and Alain Minc, telematics, i.e., the integration of telecommunications and informatics, has become very popular, especially in the context of automotive telematics, i.e., for application in vehicles. Typical applications of automotive telematic systems include automotive navigation systems using global positioning system technology, emergency warning systems for vehicles, both in vehicle-to-vehicle and in vehicle-to infrastructure settings, emergency calling systems in the case of accidents and breakdown of the vehicle, integrated hands-free cell phones, wireless safety communications, automatic driving assistance systems, mobile data, radio and television, and vehicle tracking, such as for example, as part of fleet management systems, but are not limited to these. Telematic systems may comprise electronic, electro-mechanical, and electro-magnetic devices.

SUMMARY

An automotive telematics system may include authentication of access to telematic services. Upon establishing communications between a mobile telecommunication device and the automotive telematic system, the system can receive a request to access a telematic service; determine by a processing unit of the automotive telematic system whether a personalized key for user authentication is required to access the telematic service; and if it is determine that the personalized key is required, request the personalized key from the mobile communication device.

A telematic system is based on telecommunications and informatics and can include a large number of telematic components of which some or all may interact with each other to provide a number of services to a user or other systems or system components. The telematic system may particularly, for example, be an automotive telematic system, i.e., a telematic system deployed in a vehicle such as a car, a truck, an aircraft, a train, or a ship. In an example implementation, the automotive telematic system may be deployed in a car.

Telematic service may be a service that is provided to a user, directly or indirectly, by one or several telematic components of an automotive telematic system. Directly providing a telematic service to a user may for instance include the provision and/or presentation of information and/or data to the user, such as, in the form of navigation information, visually displayed information and/or data such as for instance videos, and/or reproduction of acoustic data such as audio broadcasts or on-board telephony. Telematic service may further include receiving input from the user, such as in the form of voiced commands, on-board telephony, key inputs, for instance for vehicle navigation or games, or any other kind of human machine interaction. Indirectly providing a telematic service to a user may for instance include the provision of data to specific telematic components like the controllers for seat and mirror positions or the on-board or off-board diagnostics of predetermined telematic components. The latter may also involve the connection to and exchange of data with a remote server of a vehicle retailer or vehicle mechanics.

Providing a telematic service to a user may, in particular, involve an external service provider, such as an off-board provider of the specific service. Examples are displaying video streams, downloading videos, reproducing satellite radio broadcasts, accessing the World Wide Web, or any other data provision which requires access to an external service (data) provider. In an example, the automotive telematic system may provide a controller for accessing a remote server of an external provider, a processing unit for processing data received from the external provider and telematic components, like displays, speakers, or similar, to provide the telematic service to the user. It shall be understood that a telematic service as discussed is not limited to those services which can be provided to a user by the automotive system alone but also include those services which are provided in combination with external infrastructure like mobile communication networks, digital video (DVB) and digital audio (DAB) broadcast networks, the internet, or the like. A user may be any person present in the vehicle, such as a driver or a passenger.

The telematic system includes at least one automotive telematic component, but may include any number of automotive telematic components with any level of interconnectivity. Automotive telematic components can be hardware components installed in a vehicle but may also include software application components implemented in a single or multiple processing units. Examples of automotive telematic components may be chosen from, but are not limited to, a group that includes a car head-unit, a car radio, a car sound system, including one or more speakers, amplifiers, and D/A converters, a microphone system, including one or more microphones and A/D converters, a vehicle navigation device, a GPS (Global Positioning System) device, one or several auxiliary input devices, like a touch screen, a mouse, a control stick, a trackball, or the like, one or several sensors, like pressure sensors, road condition sensors, parking sensors, light sensors, and the like, any electronic control unit (ECU) implementing the previously mentioned or other functionalities, a powertrain control module (PCM), one or several storage media, like a hard disk drive (HDD), an optical storage device, a RAM memory, and the like, a CD and/or DVD player, a wireless router, a Wi-Fi transceiver, one or more USB connectors, a short-range wireless transceiver, such as a Bluetooth™ transceiver with a Bluetooth™ antenna, one or more auxiliary devices with a USB connector and/or short-range wireless transceiver, such as a a Bluetooth™ transceiver, a modem (for example GSM, GPRS, UMTS, or other communication device), a wireless connectivity modem, a multi-band antenna, a satellite antenna, or similar. Specific inter-component interconnections in the form of a communication bus such as the automotive networks CAN, MOST, and other vehicle communication systems or general interconnection technologies like Ethernet or USB may also play an important role at realization of specific telematic functionalities within the vehicle. Additional description of the possible components of a telematic system is provided later.

An example automotive telematic component can provide one or several specific (telematic) services to the user and/or another component of the telematic system. The service may particularly be provided to the user and/or the other component through at least one application component of the telematic system. The application component may be provided by electronic circuitry and can be implemented using a software application component in a processing unit. In particular, the application component may be a real-time application component, in a sense that execution of the application component by the processing unit happens in synchronization with a time scale predefined by other components of the vehicle. As an example, updating the display of a navigation system usually happens in synchronization with the movement of the vehicle and detected changes of the vehicle's GPS position. The processing unit may be any kind of electronic processing device, particularly a CPU or GPU as used in embedded systems, and the implementation may be in the form of a set of computer-executable instructions or program code. The instruction set or program code for implementing and/or running the application component on the processing unit may be stored in a non-transitory computer readable storage medium, such as a volatile or non-volatile memory and/or storage device and may be configured when installed in the telematic system, customized by a user, and/or updated via external input to the telematic system. The processing unit and/or the memory and/or storage device may be part of a central telematic control unit (TCU) or may be part of an automotive telematic component. Examples for such telematic components are given in the detailed description.

BRIEF DESCRIPTION OF THE DRAWINGS

Further features and exemplary embodiments as well as advantages of the present invention will be explained in detail with respect to the drawings. It is understood that the present invention should not be construed as being limited by the description of the following embodiments. It should furthermore be understood that some or all of the features described in the following may also be combined in alternative ways.

DETAILED DESCRIPTION OF THE PREFERRED EMBODIMENTS

Figure 1:
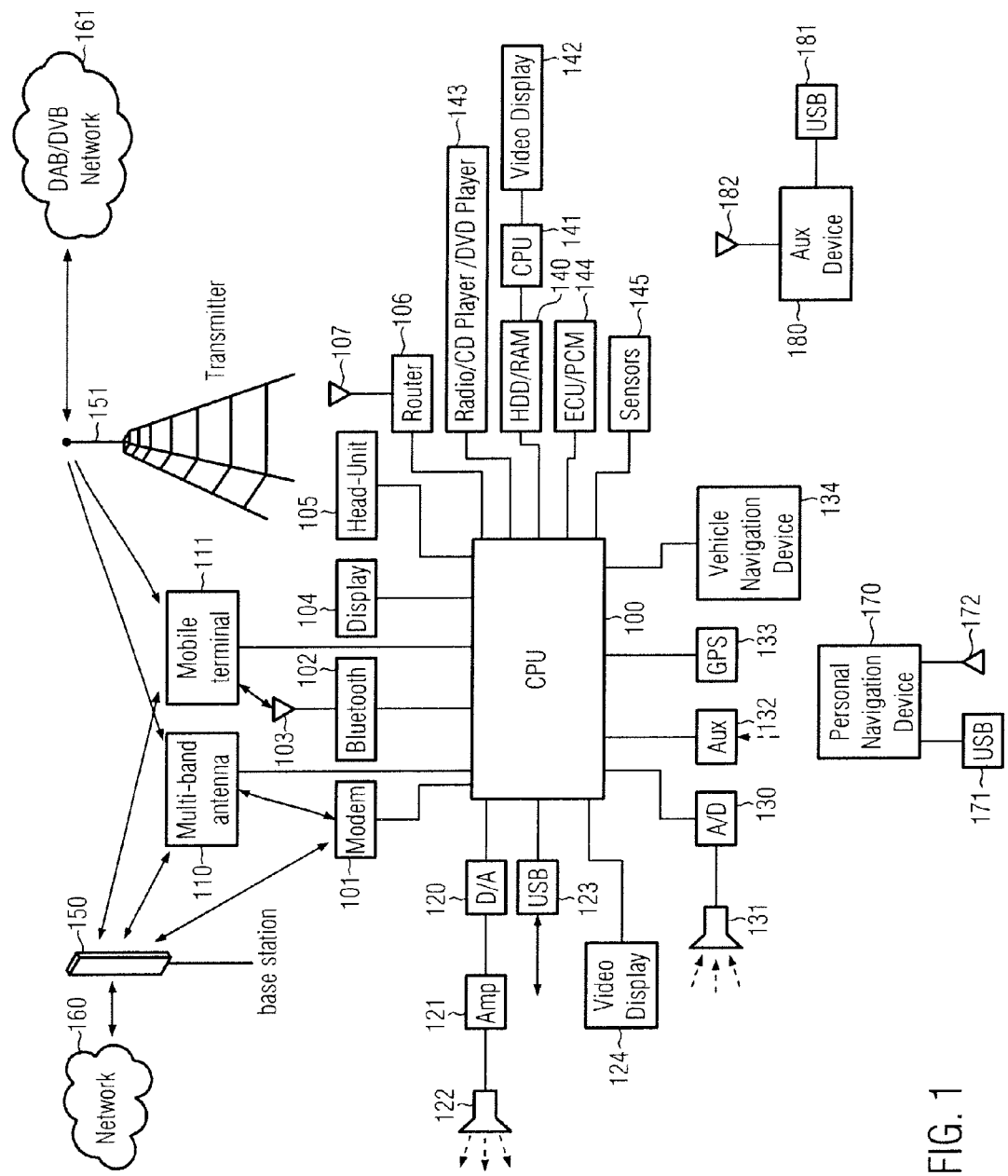
FIG. 1 shows an exemplary embodiment of an automotive telematic system.

Telematic services of telematic components provided by an application component include, but are not limited to, services from a group of infotainment related functions, such as hands-free telephony, navigation, audio services, like AM/FM radio, Digital Audio Broadcast (DAB) radio, In-Band On-Channel (IBOC) digital radio, and satellite radio, video services, like DVD playback, HDD playback, Digital Video Broadcast (DVB) video services, 3GPP mobile video services, and the like, web access, email service, traffic information services, and Human-Machine-Interaction (HMI) services like on-board games and browsable vehicle information services or any other app-like services requiring vehicle-to-infrastructure communication. The service may be provided by a single application component for a single or several telematic components, wherein the telematic components may interact with each other and/or the application component. In particular, an application component may request a telematic service from a specific telematic component like the display of a video file to a passenger via a rear-seat display, and the specific telematic component, in this case the rear-seat display, will provide the requested service in interaction with other telematic components, for instance an on-board hard disk drive. The service may also be provided by multiple application components for a single or several telematic components.

Many of the services provided by an automotive telematic system can be related to passive and active safety systems of the vehicle and therefore generally do not require interaction with a user, such as the driver. However, an increasing number of telematic services, like infotainment services or navigation services, can be specifically directed at a user, such as a driver or passenger of a vehicle. Many of these telematic services may be personalized in a sense that personal preferences and/or requirements of an individual user with respect to the provided telematic service can be taken into account by the automotive telematic system. Some examples include favorite selections of radio stations, TV programs, or websites, user defined or selected destinations for navigation systems or user defined seat and mirror arrangements, but are not limited to these. Other examples may be graphics or display settings for navigation and/or infotainment displays or access to personal information, such as telephone directories. Some telematic services may require user authentication, in particular, if they are provided by an external provider via the automotive telematic system. Specific, but not limiting examples for such telematic services are video downloads and streams, TV broadcasts, satellite radio broadcasts or access to specific websites, for which a user may be liable to pay costs. In addition, telematic services may be provided to specific users only, for example an owner of a car, due to their sensitive or safety related nature. As an examples of such a service may include establishing a connection between the automotive telematic system and a remote server of a car retailer or mechanics, for instance for diagnostic purposes. Furthermore, personal user data may be stored on the automotive telematic system, access to which a user may want to restrict.

An automotive telematic system can provide personalized access to these telematic services by use of a personalized key, such as a cryptographic key, which can be stored directly in the infotainment system of the automotive telematic system. Thus, this personalized key can become accessible to anyone who can access the automotive telematic system, authorized, such as by possession of a vehicle key, or unauthorized, such as by hacking the system. In addition, an automotive telematic system may not provide a user administration function, such as, for example, where different individual personalized keys grant authorized personalized access to different individual telematic services or personal data stored in the automotive telematic system. In some examples, the personalized keys stored in the automotive telematic system can be connected to the vehicle rather than to a specific user, and therefore cannot be used to grant access to individual telematic services for a specific user. Persons who acquire unauthorized access to the automotive telematic system may also acquire unauthorized access to those telematic services, which require user authentication by the personalized key. A safer method and apparatus for providing access to telematic services with restricted access to individual users is therefore desirable.

The telematics system provides a method for authenticated access to telematic services, such as access to those telematic services to which access is restricted to authorized users. The required authentication to access such a restricted telematic service may be done by authentication methods, like for instance, passwords, passphrases, passkeys, decryption keys, digital certificates, digital signatures, or any other authentication method. Here and in the following, the above-described authentication items are summarized under the term "personalized key" wherein the attribute "personalized" indicates that the key may be specifically assigned to an individual user or a group of users and/or a specific telematic service or a specific group of telematic services. As an example, a personal passphrase of a specific user may grant access to the contents of a specific web portal for video and audio contents, of which the specific user is a registered "paying" customer. Hence, it may be desirable to provide authenticated access to such a portal inside a vehicle, for instance, for displaying videos, which are subject to charge, to passengers in the back of the vehicle. In another example, a driver may request authenticated access to a navigation database of a provider of navigation systems in order to update the navigation data stored aboard the vehicle.

The mobile communication device may be any kind of mobile terminal, like a mobile phone, smart phone, PDA, tablet computer, notebook or similar. It may be connected to the automotive telematic system via cable, for instance to a USB connector of the telematic system, or wirelessly, for instance to short-range wireless transceiver, such as a Bluetooth™ transceiver or a Wi-Fi transceiver of the automotive telematic system.

In general, the mobile communication device is connected to the automotive telematic system prior to a request to access a telematic service. A driver or passenger may for instance connect his mobile communication device to the automotive telematic system when entering the vehicle and may later decide to request access to a telematic service, such as for instance, the display of a video. In particular, more than one mobile communication device may be simultaneously connected to the automotive telematic system. The driver may for instance have connected his mobile phone to a USB connector of the automotive telematic system while one or several passengers may have connected a smart phone to the short-range wireless transceiver, such as a Bluetooth™ transceiver and a notebook to the Wi-Fi-transceiver of the automotive telematic system. In such a case, the automotive telematic system may manage multiple connections for communication by use of one or more different connection protocols.

When the automotive telematic system receives a request to access a telematic service, a processing unit of the automotive telematic system can determine whether a personalized key for user authentication, such as for instance, one of the previously discussed personalized keys, is required to access the telematic service, such as whether access to the telematic service is restricted to authorized users. Such a request to access a telematic service may be received from a user, in particular from the driver, via an input device of the automotive telematic system, for instance by pushing a button, by operating a touch screen or a joystick or similar device, or by voice command. The input device transmits the request to the processing unit of the automotive telematic system. The transmitted request may also include information on the telematic service, like for instance a web address, a file name, a station name and a broadcast time, an identifier of the telematic service, a host or IP address of an external provider, and/or any other information that may be required to access the telematic service. From the information provided with the request, the processing unit of the automotive telematic system may determine whether a personalized key for user authentication is required to access the telematic service. In order to do so, it may read stored data related to the telematic service and/or a provider of the telematic service from an on-board database or send an appropriate request to an external provider.

The processing unit may be any kind of processing device, such as a CPU or GPU as used in embedded systems, and the implementation of the described method steps may be hardware in the form of a set of computer executable instructions or program code stored in a non-transitory computer readable medium, such as a RAM, ROM, flash or other form of memory. If it is determined by the processing unit that a personalized key is required, the automotive telematic system sends a request for the personalized key via an appropriate telematic component, such as via a USB connector, a short-range wireless transceiver such as a Bluetooth™ transceiver, or a Wi-Fi transceiver, to the mobile communication device. The request may be sent to the mobile communication device via an encrypted channel, in an encrypted form, using any encryption technology. The request sent to the mobile communication device may include sufficient information and/or data for the mobile communication device to locate and/or identify an appropriate personalized key stored in the mobile communication device.

In an embodiment, connecting the mobile communication device to the automotive telematic system may include establishing a user identity associated with the mobile communication device, such as in the form of a username or a user identifier. This user identity may be used by the automotive telematic system to determine, from which mobile communication device to request the personalized key in the case that several mobile telecommunication devices are connected to the automotive telematic system. A request to access a telematic service may in particular include information on a user identity, which may be used by the automotive telematic system to select an appropriate mobile communication device. Thus, the requested personalized key may be uniquely identified by both the automotive telematic system and the mobile communication device via a user identity only or via a user identity in combination with information on the requested telematic service.

In an alternative embodiment, the automotive telematic system may send the request for the personalized key to any mobile communication device, which is connected to the automotive telematic system. In this case, the requested personalized key may be identified by the mobile communication device via information on the requested telematic service only. In this case, it is sufficient if one user, who connected his mobile communication device to the automotive telematic system, possesses an appropriate personalized key to access the requested telematic service. This may significantly simplify the provision of restricted telematic services, like access to a specific video portal, to a group of passengers in a vehicle. However, incurred charges may be harder to predict with this alternative embodiment, so that the previously discussed embodiment may be preferred by passengers for billing transparency.

In another embodiment, the automotive telematic system may use the requested personalized key to provide secure access to user data stored in a non-transitory memory of the automotive telematic system. The memory may be any kind of memory, operable as a persistent storage device, such as a hard disk drive or an optical storage device. The data may be user specific in a sense that it should only be accessible to a specific user, like for instance preferences of the user in terms of seat and/or mirror positions, favorite radio and/or TV stations or the like, and may be stored in the memory in an encrypted form. In the latter case, the requested personalized key may be used by the automotive telematic system to decrypt the user data when it is accessed by the user.

By requesting a specific personalized key from the mobile communication device, the automotive telematic system may differentiate between different users and/or different telematic services. Thus, the system allows for a user management and an access management with respect to restricted telematic services. It may grant individual users limited access to individual telematic services by requesting corresponding individual personalized keys from the corresponding mobile communication devices. Furthermore, access to restricted telematic services is not limited by corresponding access keys stored in the automotive telematic system, but instead may be flexibly achieved by connecting a mobile communication device, which holds the required personalized key to the automotive telematic system. Thus, even passengers, who do not possess a vehicle key, such as a car key, may gain access to restricted telematic services of the vehicle by using their own personalized keys in the form of a mobile communication device, like a smart phone. For instance, access to chargeable satellite radio may be provided to a passenger who possesses an appropriate personalized key, even if the vehicle and/or the driver is generally not registered for the satellite radio service.

In an embodiment, the requested personalized key may be transmitted from the mobile communication device to the automotive telematic system in an encrypted form. In this example, communication between the automotive telematic system and the mobile communication device may be carried out via an encrypted channel. Any method of cryptography, like for in-stance, public key cryptography, asymmetric key cryptography, Diffie-Hellman keys, digital signature algorithms, elliptic curve techniques, password-authenticated agreement techniques, the Paillier cryptosystem, RSA encryption algorithms, secure shell (SSH), Cramer-Shoup cryptosystem, identity based encryption (IPE), link keys, wired equivalent privacy (WEP), Wi-Fi protected access (WPA, WPA2), pre-shared keys (PSK), or similar cryptography may be used.

In an embodiment, the mobile communication device may run an application for transmitting the requested personalized key to the automotive telematic system. The application may be run on a processing unit of the mobile communication device in an application layer upon receipt of the request for the personalized key from the automotive telematic system. The encrypted form of the requested personalized key may be generated by the processing unit in the application layer. Again, the processing unit of the mobile communication device may be any electronic processing unit, for instance, a CPU or a GPU. The mobile communication device may run an application or app on the processing unit, wherein the application may process the request for the personalized key received from the automotive telematic system, locate and/or read the appropriate personalized key from a memory of the mobile communication device, and transmit the requested personalized key to the automotive telematic system in the application layer. By carrying out the encryption and/or authorization in the application layer, using technologies such as SSL, SSH, GnuPG, PGP, or the like, the application run by the mobile communication device can provide end-to-end encryption wherein all traffic between the automotive telematic system and the mobile communication device is encrypted. End-to-end encryption generally reduces the risk of unauthorized people spying on the traffic between the communication partners.

In an embodiment, connecting the mobile communication device to the automotive telematic system may comprise automatically establishing a short-range wireless connection, such as a Bluetooth™ connection between a short-range wireless transceiver, such as a Bluetooth™ transceiver of the mobile communication device and a short-range wireless transceiver, such as a Bluetooth™ transceiver of the automotive telematic system. Any short-range wireless technology, such as Bluetooth™ technology may be used, for example, Bluetooth™ version 2.1 and up and Bluetooth™ coupled with Wi-Fi. Bluetooth™ is a packet-based protocol with a master-slave structure. A master Bluetooth™ device can automatically communicate with a maximum of seven devices. At any given time, data can be transferred between the master and one other device, except for the broadcast mode. In the present embodiment, the automotive telematic system may be configured as the master while any mobile communication device connected to it may be configured as a slave. Connection of the mobile communication device to the automotive telematic system may be initiated automatically from either the mobile communication device, or the automotive telematic system, and may involve the discovery of short-range wireless enable devices, such as a Bluetooth™ enabled devices, within range. Use of a service of a short-range wireless device, such as a Bluetooth™ device, may require pairing or acceptance by an owner. In an example, a default mode of the automotive telematic system may be set to require acceptance by a user, such as the driver, to connect a mobile communication device within range to the automotive telematic system via a short-range wireless protocol, such as Bluetooth™. Thus, accidental and/or unauthorized connection of a short-range wireless device, such as a Bluetooth™ enabled mobile communication device within the range of the automotive telematic system, such as outside the vehicle, can be avoided. On the other hand, technology such as Bluetooth™ technology provides a range sufficient to connect any short-range wireless enabled device, such as a Bluetooth™ enabled mobile communication device inside the vehicle, to the automotive telematic system.

In an embodiment, establishing the short-range wireless connection, such as a Bluetooth™ connection may comprise secure pairing, such as Secure Simple Pairing (SSP) of the mobile communication device and the automotive telematic system. Secure Simple Pairing (SSP) has been available since Bluetooth™ version 2.1. In other examples, other secure pairing protocols may be used. For security reasons, it may be necessary to recognize specific devices and thus enable control over which devices, such as mobile communication devices, are allowed to connect to a given device, such as a Bluetooth™ device, here, the automotive telematic system. At the same time it may be useful for Bluetooth™ devices like the mobile communication device and the automotive telematic system to be able to automatically establish a connection without user intervention upon coming into range of one another.

The pairing process of two short-range wireless transceiver, such as Bluetooth™ enabled devices, may be triggered either by a specific request from a user to create a bond (dedicated bonding) or may be triggered automatically when connecting to a service, where the identity of the device is required for security purposes (general bonding). Thus, a pairing of a mobile communication device and the automotive telematic system may be established for the first time when the automotive telematic system requests a personalized key from the mobile communication device, wherein the user of the mobile communication and/or the user of the automotive telematic system authorizes the transmission of the requested personalized key. Once a pairing has been established, the mobile communication device and the automotive telematic system may remain paired until the user chooses to disconnect the connection or the mobile communication device is moved out of range of signal transmission by the automotive telematics system. If at a later time the mobile communication device is brought back into the range of the automotive telematic system, the automotive telematic system may automatically recognize the specific mobile communication device and automatically establish a paired connection via short-range wireless protocol, such as Bluetooth™, to it. This allows a driver or a passenger to automatically connect his mobile communication device to the automotive telematic system after once having established a pairing.

In an embodiment, connecting the mobile communication device to the automotive telematic system may include establishing a Wi-Fi connection between a Wi-Fi transceiver of the mobile communication device and a Wi-Fi transceiver of the automotive telematic system. The Wi-Fi connection may be established using any secure protocol for wireless communication, like for instance, wired equivalent privacy (WEP), Wi-Fi protected access (WPA and WPA2), pre-shared key (PSK), extensible authentication protocol (EAP); light weight extensible authentication protocol (LEAP), protected extensible authentication protocol (PEAP), end-to-end encryption or some other secure protocol. Connecting a mobile communication device to the automotive telematic system via Wi-Fi may require authentication on the side of the mobile communication device and/or the side of the automotive telematic system, similar to the above described authentication of a short-range wireless connection, such as a Bluetooth™ connection. In general, the Wi-Fi module of the automotive telematic system may be set up to require authentication before establishing a Wi-Fi connection to a mobile communication device within range. In the case that the mobile communication device is directly connected to a USB connector of the automotive telematic system, such as via cable, an authentication process may be omitted.

In an embodiment, the requested personalized key may be read from a storage unit, such as from a subscriber identity module (SIM) card, of the mobile communication device, wherein at least one personalized key may have previously been stored on the storage unit, such as on the SIM card. The storage unit of the mobile communication device may be any one of a built-in memory, a memory card or a SIM card. The at least one personalized key may be stored on the storage unit in an encrypted form. Storing the requested personalized key on a storage unit of the mobile communication device can eliminate the necessity of storing any personalized keys on the automotive telematic system, which might be hacked, such as in the case of theft of the vehicle. Storing the personalized keys on the storage unit, such as the SIM card, of the mobile communication device allows for associating the personalized keys with a specific user, namely, the contracted user of the storage unit. By storing personalized keys on the storage unit of the mobile communication device, the personalized keys become mobile in a sense that access to restricted automotive telematic services may be authorized in different vehicles, such that the owner of the mobile communication device may enjoy specific features, like video displays, of a specific vehicle. More than one personalized key may be stored on the storage unit of the mobile communication device. Based on information received together with a request for transmission of a specific personalized key, the mobile communication device may locate and select an appropriate personalized key and read it from the storage unit before transmitting it to the automotive telematic system. The mobile communication device may include a short distance communication unit, such as a Bluetooth™ transceiver and/or a Wi-Fi transceiver, which is adapted to establish a connection with the automotive telematic system as previously described.

In an embodiment, the telematic service may at least be partly provided by an external provider, and determining whether the personalized key for user authentication is required to access the telematic service may include: establishing a connection between the automotive telematic system and a remote server of the external provider; sending a request to access the telematic service to the remote server; and determining from a response received from the remote server whether the personalized key for user authentication is required to access the telematic service.

As described previously, an external provider may be a car retailer, a mechanic, a provider of navigation services, or any provider of infotainment services, whether via the World Wide Web, a digital audio broadcasting network, a digital video broadcasting network, a satellite radio network, or any other external infrastructure. Hence, providing the telematic service may involve communication between the automotive telematic system and a remote server or backend server of the external provider via any of the above mentioned infrastructure. In particular, the automotive telematic system may establish a connection with a remote server of the external provider via a modem, in particular a Wi-Fi modem, a multi-band antenna, a short-range wireless transceiver, such as a Bluetooth™ transceiver, and/or a mobile terminal like a mobile communication device, which has been connected to the automotive telematic system. In particular, connection between the automotive telematic system and the remote server of the external provider may be established via any of the mobile communication devices which have been connected to the automotive telematic system. In such a case, a video may be for instance downloaded via the data connection of a mobile communication device belonging to the driver and connected to the automotive telematic system, while the personalized key required for authentication for the download may be retrieved from a mobile communication device of a passenger inside the same vehicle. Ultimately, the video service may then be provided by the automotive telematic system on a display of the vehicle, e.g., to the passenger.

Once the automotive telematic system has received a request to access a specific telematic service, it may determine from information included with the request, whether the telematic service is at least partly provided by an external provider, and in that case establish a connection between the automotive telematic system and a remote server of the external provider. Information on the remote server of the external provider, like for instance an IP address, may be contained within the request received from an input device of the automotive telematic system. Once the connection has been established, the automotive telematic system may send a request to access the telematic service, to the remote server of the external provider. In return, the remote server of the external provider may determine from the request whether access to the requested telematic service is restricted and requires authentication by a personalized key, and send a corresponding response to the automotive telematic system. Then, the automotive telematic system may determine from the response whether and/or which personalized key for user authentication is required to access the telematic service and request the corresponding personalized key from a mobile communication device connected to the automotive telematic system. The automotive telematic system may use a personalized key received from the mobile communication device to authenticate the requested telematic service with the remote server of the external provider.

In an embodiment, accessing the telematic service may include accessing personalized data stored in an encrypted form on a storage unit of the automotive telematic system, and accessing the personalized data may include decrypting the personalized data using the requested personalized key. The encryption and decryption may be carried out according to any method, such as, using an encryption key included in the personalized key. The personalized data may include user preferences for seat and/or mirror positions, as well as personal preferences for radio and/or video broadcast stations, or any kind of user information. The personalized data may be further used by the automotive telematic system to provide further telematic services, like adapting a seat and/or mirror position, changing the default settings of radio and/or TV stations, or customizing a display of a navigation system according to the preferences of a user.

In an embodiment, the requested personalized key may include user identification and at least one of a passphrase and an encryption key. The user identifications may be in the form of a user name or a user ID and the passphrase may be any one of a password, a passphrase, or a personal identification number (PIN). The encryption key may be any encryption key.

In an embodiment, the requested personalized key may not be stored by the automotive telematic system. In particular, the automotive telematic system may use the received personalized key to authenticate access to an on-board telematic service or a remote server of an external provider, provide the requested telematic service to the user, and then discard the personalized key from the system. Thus, a possible security risk caused by storing personalized keys on the automotive telematic system can be avoided.

The automotive telematic system is adapted to be connected to a mobile communication device, which may include: an input device adapted to receive a request to access a telematic service; and a processing unit adapted to determine whether a personalized key for user authentication is required to access the telematic service; wherein if it is determined that the personalized key is required, the processing unit is adapted to request the personalized key from the mobile communication device, which is connected to the automotive telematic system.

Equivalent modifications and extensions as described with respect to the method for authenticated access to telematic services may also be applied to the automotive telematic system. In particular, the automotive telematic system may be further adapted to perform communication with the mobile communication device in an encrypted form.

Furthermore, the automotive telematic system may include a transceiver, such as a Bluetooth™ transceiver, adapted to establish a connection, such as a Bluetooth connection, to a transceiver, such as a Bluetooth™ transceiver of the mobile communication device, wherein establishing the connection, such as a Bluetooth™ connection includes pairing, such as Secure Simple Pairing (SSP), of the mobile communication device and the automotive telematic system. Equivalent modifications and extensions as described above with respect to a connection such as a Bluetooth™ connection between the automotive telematic system and the mobile communication device may be applied. Equally, the automotive telematic system may include a Wi-Fi transceiver, adapted to establish a Wi-Fi connection to a Wi-Fi transceiver of the mobile communication device.

According to an embodiment, the telematic service may at least be partly provided by an external provider. The automotive telematic system may be further adapted to establish a connection to a remote server of the external provider and to send a request to access the telematic service to the remote server via the connection. A processing unit included in the automotive telematics system may be further adapted to determine from a response received from the remote server whether the personalized key for user authentication is required to access the telematic service. Similar modifications and extensions as previously described may be applied.

The automotive telematic system allows for the separation of personalized keys for user authentication for access to restricted telematic services from the automotive telematic system, thereby reducing the risk of unauthorized access to restricted and/or chargeable telematic services. In addition, the system allows for provision of individual telematic services to individual users, wherein the automotive telematic system includes a user management functionality with respect to required personalized keys and available telematic services. For example, the automotive telematic system may grant access to vehicle specific data, like navigation data and/or vehicle safety related data, as well as to remote services of a car retailer and/or mechanics exclusively to a driver of the vehicle while providing individual infotainment services, like video on demand, pay-per-view, or satellite radio, to those users, such as passengers, who possess a personalized key on the their personal smart phone or notebook. The automotive telematic system may provide the infrastructure to deliver a telematic service to a user, while access to a specific telematic service remains limited to those users who possess the corresponding authentication keys (and can be charged for them). The system may be particularly interesting for vehicles that are typically shared between a group of users, like rentals, commercial vehicles, or shared cars. In that case, the owner of the vehicle may equip the vehicle with an extensive telematic system, capable of providing comprehensive telematic services, and leave it to a user to provide the required personalized keys to access the specific telematic services, to which the user wishes to gain access. This may reduce costs for both the owner and the user of the vehicle, while making rental of the vehicle more attractive to the user.

Also, users may protect their individual data stored in the infotainment system of the automotive telematic system against unauthorized access. Finally, car retailers may provide their customers with individual and secure telematic services.

A possible embodiment of an automotive telematic system is exemplified in the following with respect to FIG. 1. It shall be understood that the described components are merely intended as non-limiting examples of automotive telematic components, wherein some components may be omitted or replaced by other telematic components.

Components 100 to 145 and 170 to 182 may be installed in a vehicle, while components 150 to 161 may be external components which are not part of the automotive telematic system but may interact with one or more of the telematic components of the vehicle.

A vehicle equipped with a telematic system may contain a display 104, as a visual front end interface located in the vehicle. The user may also be able to interact with the interface via a touch sensitive screen, via pressing a button, via audible speech and speech synthesis, or other HMI (Human-Machine-Interaction) components such as a mouse, touching device, gesture or any other interaction. Interaction via audible speech and speech synthesis or analysis may be via a microphone 131 and an A/D converter 130 for receiving input from the user and via a D/A converter 120, an amplifier 121, and one or several speakers 122 for giving audible output to the user. The visual front end interface may be part of, for example, a head-unit for a centralized interaction of the user with the telematic system or separate from one or more dedicated head-units 105, such as, for interaction of the user with audio or telephony components of the telematic system.

In the illustrative embodiment shown in FIG. 1, a processing unit 100 (or processor), such as a central processing unit (CPU), digital signal processor (DSP) and/or a graphical processing unit (GPU) of a system, such as an embedded system, controls at least a portion of the operation of the telematic system. However, the system is not limited to this configuration, and alternatively, or in addition, may provide at least one further processing unit assigned to a specific telematic component or a group of telematic components, such as for instance a processor 141, such as a CPU, provided with a video display 142, possibly as part of a rear seat entertainment system for displaying movies from a storage device, like a hard disk drive 140. The processing unit allows on-board processing of instructions, commands, and routines, particularly as part of an application component of the telematic system. The processing unit 100 may further be connected to both non-persistent and persistent storage devices 140 that are non-transitory computer readable storage medium. In this illustrative embodiment, the non-persistent storage device is a random access memory (RAM) and the persistent storage device is a hard disk drive (HDD) or flash memory.

The processing unit 100 may also be provided with a number of different inputs allowing the user to interface with the processing unit. In this illustrative embodiment, a microphone 131, an auxiliary input 132, a USB input 123, a GPS input 133, and a Bluetooth™ input 102 are all provided. An input selector may be provided to allow the user to swap between various inputs. Input to the microphone 131 is converted from analog to digital by an A/D converter 130 before being passed to the processing unit 100.

Outputs from the telematic system may include, but are not limited to, a video display 124 and an audio system, such as a speaker 122 and/or stereo/surround system output. The speaker may be connected to an amplifier 121 and may receive its signal from the processing unit 100 through a digital-to-analog converter 120. Output can also be made via the transceiver 102, such as a Bluetooth™ transceiver 102 with a Bluetooth™ antenna 103 to a remote device, such as a Bluetooth™ device which can be a personal navigation device 170 or mobile communication device with an antenna, such as a Bluetooth™ antenna 172. Communication with a personal navigation device can also be achieved via USB connectors 123 and 171. The telematic system may further include a vehicle navigation device 134, which may interact with the GPS unit 133 and/or a mobile network 160 via a base station 150 and a multi-band antenna 110 or a mobile terminal (mobile communication device) 111. The mobile terminal 111 may particularly be a cell phone, smart phone, PDA, or the like and may be connected to the processing unit 100 either directly, via a USB connector 123, or via the transceiver 102 with its antenna 103. The multi-band antenna 110 may exchange data with the processing unit 100 either through a wire or wirelessly through a modem 101. In this example, the base station 150 and the network 160 are not part of the telematic system and provided outside the vehicle. In some embodiment, the base station 150 may be a Wi-Fi access point.

Data may be communicated between the central processing unit 100 and the network 160 utilizing, for instance, a data-plan, data over voice, or DTMF tones associated with the mobile terminal. Both multi-band antenna 110 and the mobile terminal 111 may exchange data bi-directionally with the base station or Wi-Fi access point 150. The modem 101 may also communicate directly with a network 160 through communications with a cellular tower 150. As a non-limiting example, the modem 101 may be a USB cellular modem and the communication may be cellular communication.

In an example embodiment, the processing unit 100 is provided with an operating system including an API to communicate with a modem and corresponding application software. The modem, using the application software, may access the transceiver 102 which uses an embedded module or firmware on the transceiver 102 to complete wireless communication with a remote transceiver (such as that of the mobile terminal 111). Alternatively or in addition, in an embodiment the mobile terminal 111 may include a modem for voice band or broadband data communication. If the user has a data-plan associated with the mobile terminal 111, it is possible that the data-plan allows for broadband transmission and the telematic system could use a much wider bandwidth (speeding up data transfer). Alternatively or in addition, in an embodiment the mobile terminal 111 may be replaced with a cellular communication device, such as, without limitation, a modem 101, that is installed in the vehicle. In yet another embodiment, the mobile terminal 111 may be replaced with a wireless local area network (LAN) device capable of communication over, for example, an 802.11g network (such as Wi-Fi) or a WiMax network. In an embodiment, incoming data can be passed through the mobile terminal 111 via a data-over-voice or data-plan, through the on-board transceiver 102 and into the central processing unit 100.

Data, whether incoming or outgoing or temporary, may be stored on the storage device(s) 140, such as in HDD or in RAM or any other storage media until such time as the data is no longer needed. The storage device(s) 140 or other storage media may in particular be used as the memory for storing individual user data or data downloaded from an external provider. The communication with a remote server of an external provider may be performed via the modem 101, the multi-band antenna 110, the transceiver 102, or the mobile terminal 111, such as via a mobile network 160 or a wireless network.

The central processing unit may further be in communication with a variety of other auxiliary devices 180, like a mobile communication device of a user. These devices can be connected through wireless 182 or wired 181 connections (such as a USB connection). Also, or alternatively, the processor unit 100 may be connected to a vehicle based wireless router 106, using for example a Wi-Fi transceiver 107. This could allow the processor to connect to remote networks in range of the local router 106.

The processing unit 100 may further interact with a radio, a CD player, or a DVD player 143 to provide audio and/or video to the audio system and/or a video display 142. Audio and/or video may also be provided via the multi-band antenna 110 or the mobile terminal 111 from, for example, a mobile network 160, wireless network, or digital broadcast network 161 (Digital Audio Broadcast, Digital Video Broadcast) via a broadcast transmitter 151 outside the vehicle. Audio and video data may be downloaded or streamed through the above described connections, or any other system for providing downloaded and or streamed data. In the case of a download, the data may be temporarily or persistently stored in the storage device(s) 140, such as an HDD, or other storage device. A further processing unit 141 may later read the stored data from the storage device 140 and provide video and/or audio services through the vehicle's speaker system 122 or a video display 142.

The processing unit 100 may further interact with a microphone 131 and the vehicle's audio system and/or speaker system 122 to provide hands-free telephony, e.g., via the mobile terminal 111. Similarly the processing unit 100 may interact with the mobile terminal 111 and vehicle diagnostics (not shown) to send an emergency call or a breakdown call.

The processing unit 100 may also interact with an vehicle operating system 144 such as an engine control unit (ECU) to control engine parameters or monitor the vehicle's engine. Alternatively, or in addition, the processing unit 100 may interact with the vehicle operating system 144 such as a powertrain control module (PCM) and a series of sensor systems 145, like for instance but without limitation, a tire pressure monitoring system, a road condition sensor, a parking sensor, a temperature sensor, an ambient light sensor, and the like. Wired communications within the automotive telematic system may be carried out using a vehicle communication bus such as MOST (Media Oriented Systems Transport), CAN (Controller Area Network), IEEE 1394, or other communication technologies. While interaction of the processing unit with the vehicle operating system, such as the ECU or PCM, can be important with respect to EOBD (European On-Board Diagnostics) or OBD-II (On-Board Diagnostics-II) regulations, the examples and embodiments of an automotive telematic system described include those components which provide a specific group of infotainment and/or vehicle safety services, as previously discussed.

Some of the infotainment (telematic) services which may be provided by the automotive telematic system are described in the following.

An example application component may provide hands-free telephony in interaction with a microphone 131 and A/D converter 130 and the vehicle's audio system, that can include speakers 122, an amplifier 121, and D/A converter 120, as well as a mobile terminal 111. The provided telematic service may involve further application components, like for instance a speech recognition component or application components controlling a volume of the radio and/or display devices.

A further example application component may provide on-board navigation services in interaction with the GPS unit 133, the vehicle navigation device 134 or a personal navigation device 170, as well as the modem 101 and the multi-band antenna 110.

Further example application components may provide audio and/or audio/visual services, such as AM/FM radio reception, In-Band On-Channel (IBOC) radio reception, or digital audio broadcast radio, and/or video services such as DVD/CD playback, HDD playback, digital video broadcast services, video-on-demand services, pay-per-view services, or video downloads/streams from the internet. Depending on the service, the mobile terminal 111 or the multi-band antenna 110 may receive data from a base station 150 or a broadcast transmitter 151. The playback of a video stored on a storage device 140, such as an HDD, may also involve a further processing unit 141 and a further (rear) video display 142. In an example implementation, the further processing unit 141 can handle most of the processing required for displaying a movie, while the application component on the central processing unit 100 only monitors the success of the service, or the further processing unit 141 may even implement the application component itself.

As a further example telematic service, an application component may provide web access, such as for video downloads or streams, and/or email access, such as in interaction with the modem 101 and the multi-band antenna 110, the wireless router 106, or the mobile terminal 111. Through the mobile terminal 111 and/or the multi-band antenna 110, a further application may receive traffic information from a network 160, and propose a different route in interaction with a vehicle navigation device 134 and the GPS unit 133.

An example application component may provide telematic services relying on HMI (Human-Machine Interaction) like a touch sensitive screen, a mouse, a control stick, or trackball, for example to play (online) games, browse through the monitoring system of the vehicle, to interact with the vehicle navigation device 134 and/or to operate a media station of the vehicle.

A nearly infinite number of telematic services, which can be provided by an application component implemented in a processing unit in interaction with one or more telematic components, are possible and the system is not limited to the above described examples but may be applied to any telematic system.

Figure 2:
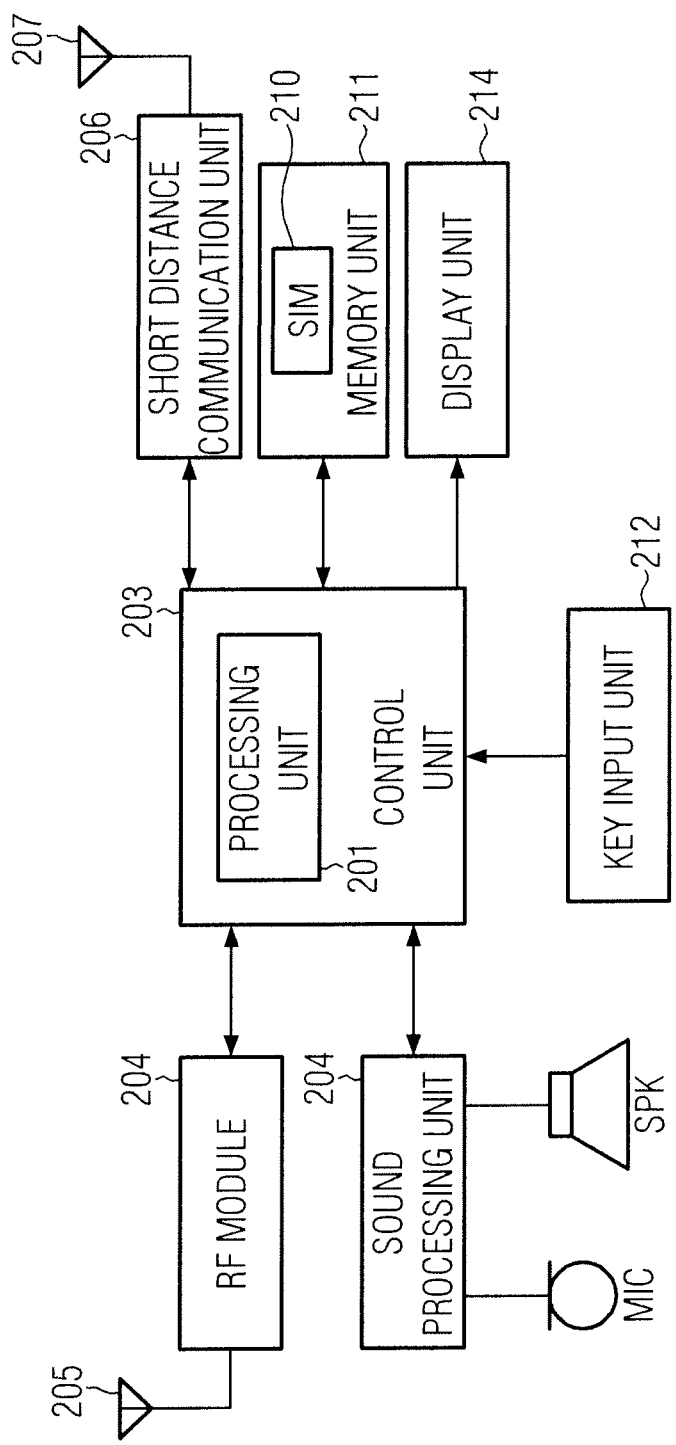
FIG. 2 shows an exemplary embodiment of a mobile communication device.

FIG. 2 shows an exemplary embodiment of the mobile communication device. The mobile communication device includes a control unit 203, a processing unit 201, a radio frequency (RF) module 204 including its antenna 205, a sound processing unit 204, a short distance, or short-range, communication unit 206 including a short-range antenna 207, a key input unit 212; a memory unit 211, a user identity storage 210, such as a subscriber identity module (SIM) card, and a display unit 214, which are connected to the control unit 203. The control unit 203 may control each functional part of the mobile communication device.

The RF module 204 performs a wireless communication function of the mobile communication device. The RF module 204 can include an RF transmitter (not shown) for up-converting and amplifying the frequency of a signal to be transmitted and an RF receiver (not shown) for low noise amplifying a received signal and down-converting a frequency of the low noise amplified signal. The RF module 204 also may include a transmitter (not shown) for encoding and modulating a signal to be transmitted and a receiver (not shown) for demodulating and decoding a received signal.

In an exemplary implementation, the RF module 204 may receive and/or send a phone call, a multimedia message, a short message, and/or a cell broadcasting message. The RF module 204 may also receive a signal and/or data by means of wireless broadband, for example portable wireless internet technology, and/or high-speed downlink packet access (HSDPA), that is packet based data communication technology.

The short distance communication unit 206 performs a short range communication function of the mobile communication device. More particularly, in an exemplary implementation, if the short distance communication 206 includes a wireless local area network (WLAN) module, the mobile communication device can receive or transmit a signal and data by means of the WLAN module. If the short distance communication unit includes, for example, a Bluetooth™ module, the mobile communication device can receive or transmit a signal and data by means of the Bluetooth™ module. If the short distance communication unit 206 includes, for example, a Zigbee module, the mobile communication device can receive or transmit a signal and data by means of the Zigbee module. If the short distance communication unit 206 includes, for example, a universal serial bus (USB) module, the mobile communication device can receive or transmit a signal and data by means of the USB module.

The sound processing unit 204 can convert a signal representative of a sound signal input from the control unit 203 to an audible sound. The key input unit 212 can include numeric keys or control representations of numeric keys, for performing mobile terminal functions and function keys for various functions, generating a key signal corresponding to a key selected by a user, and outputting the key signal to the control unit 203.

The display unit 214 displays a current state and an operation state of the mobile communication device under the control of the control unit 203, and may include a liquid crystal display (LCD) or organic light emitting diodes (OLED), or any other form of digital display.

The memory unit 211 may include non-transitory computer readable storage medium, such as built-in memory, memory cards, and/or a subscriber identity module (SIM) card 210.

Figure 3:
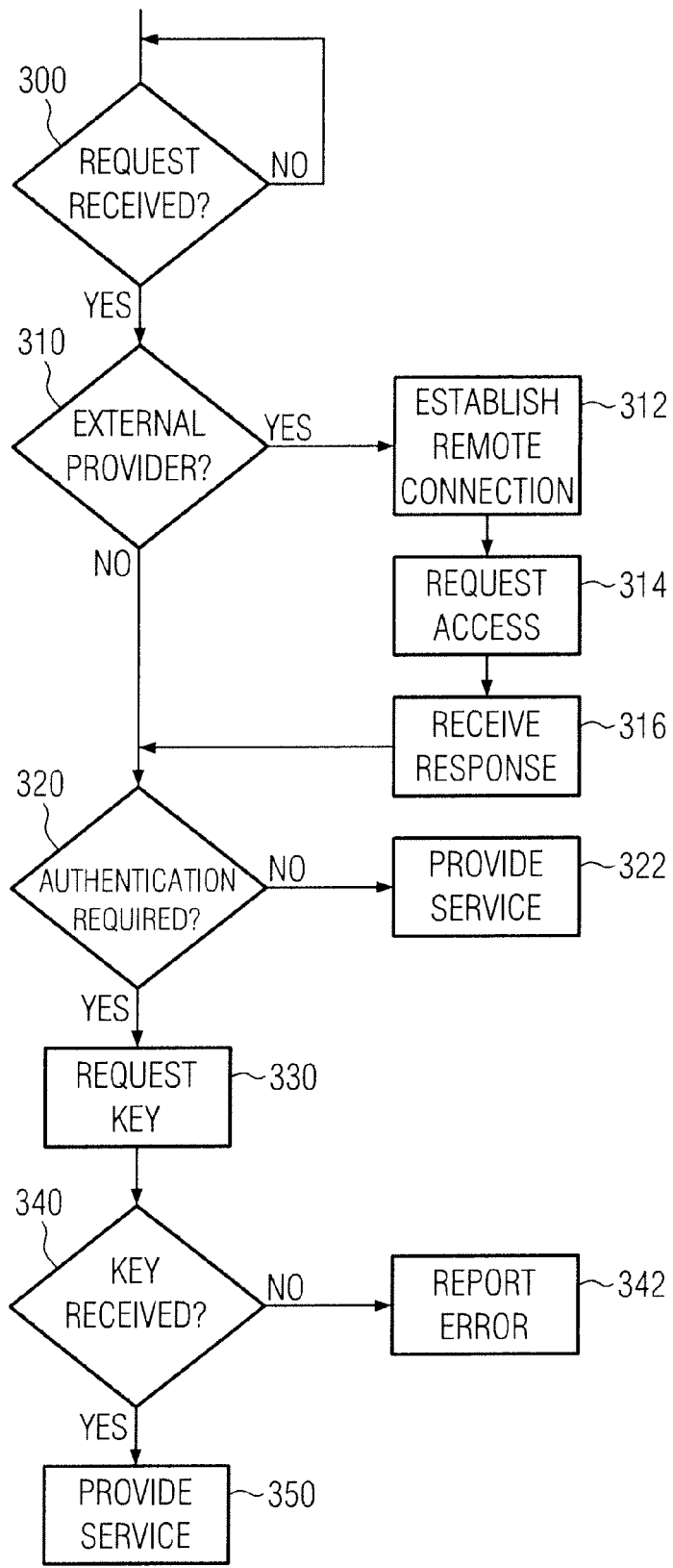
FIG. 3 shows a flow diagram for providing authenticated access to a telematic service at the site of the automotive telematic system.

FIG. 3 shows a flow diagram of example operation for authenticated access to a telematic service of the automotive telematic system according to an exemplary embodiment. In step 300, the automotive telematic system checks whether a request to access a telematic service has been received. If not, the automotive telematic system returns to checking whether a request has been received. If yes, the automotive telematic system may automatically determine in step 310 whether the requested telematic service is at least partly provided by an external provider based on information contained in the request. If it is determined that the requested telematic service is at least partly provided by an external provider, the automotive telematic system establishes a connection to a remote server of the external provider in step 312. Once the connection to the remote server of the external provider has been established, the automotive telematic system sends a request to access the telematic services to the remote server in step 314. Based on information contained in the request sent to the remote server, a processing unit of the remote server may determine, whether a personalized key for user authentication is required to access the telematic service. (Alternatively or in addition, in other examples the automotive telematics system can independently determine whether a personalized key for user authentication is required to access the telematic service.) The remote server then sends a response based on the result of this determination to the automotive telematic system. In step 316, the automotive telematic system receives the response from the remote server and returns control to the main thread of the process.

If it is determined in step 310 that the telematic service can be provided by the automotive telematic system alone, such as without access to a remote server, the processing unit of the automotive telematic system determines in step 320, whether a personalized key for user authentication is required to access the telematic service. In addition, after having received a response from a remote server in step 316, the processing unit determines in step 320 from the response received from the remote server, whether a personalized key for user authentication is required to access the telematic service. If the result of this determination is negative, the automotive telematic system proceeds to provide the requested telematic service without user authentication in step 322.

If it is determined that a personalized key for user authentication is required to access the telematic service, the automotive telematic system requests the personalized key from a mobile communication device in step 330 and waits until the requested key is received. In step 340, the automotive telematic system determines whether the requested personalized key has been received within a predetermined period of time (time out) and if the requested personalized key has been received, provides an error signal in step 342 for indication, for example, to the user or to an appropriate telematic component. If the requested personalized key has been received within the predetermined period of time in step 340, the automotive telematic system proceeds to provide the requested telematic service in step 350. The automotive telematic system may then or later discard the requested personalized key without storing it in a memory of the automotive telematic system.

Figure 4:
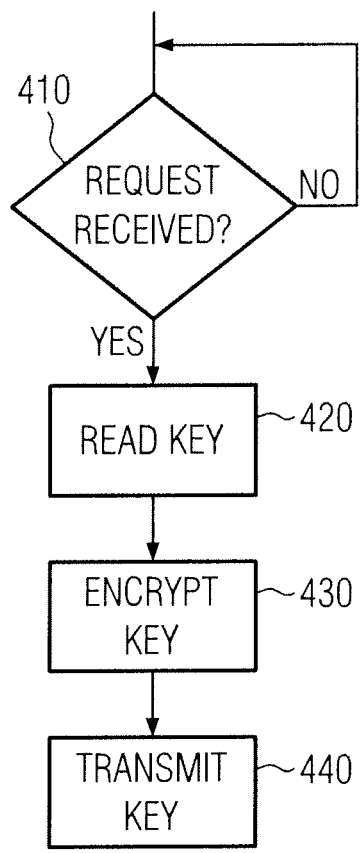
FIG. 4 shows a flow diagram for the transmission of a requested personalized key by a mobile communication device.

FIG. 4 shows a flow diagram for example operation related to the transmission of a requested personalized key by a mobile communication unit according to an exemplary embodiment. In step 410, a processing unit of the mobile communication device determines whether a request for a personalized key has been received, and if not, returns to the determination step 410. If it is determined that a request for a personalized key has been received in step 410, the processing unit locates and reads the requested personalized key from a memory unit of the mobile communication device in step 420. Based on information received together with the request for the personalized key, the application may select an appropriate personalized key from a plurality of personalized keys stored in the memory unit of the mobile communication device. In an example embodiment, the mobile communication unit may request user permission to send the personalized key.

In step 430, the processing unit of the mobile communication device encrypts the requested personalized key and subsequently transmits the encrypted personalized key in step 440 to the automotive telematic system. The transmission of the requested personalized key may be carried out in the application layer of the mobile communication device, thereby providing end-to-end encryption of the communication with the automotive telematic system. To this end, the requested personalized key may be encrypted together with the application layer via the processing unit of the mobile communication device.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for authenticated access to telematic services, comprising:
    establishing a connection between a mobile communication device and an automotive telematic system;
    after establishing the connection, receiving, from a user via an input device of the automotive telematic system, a request to access a telematic service;
    after the receiving, determining by a processing unit of the automotive telematic system that a personalized key for user authentication is required to access the requested telematic service;
    in response to determination that the personalized key is required, the processing unit requesting the personalized key from the mobile communication device; and
    after the requesting, receiving, with the automotive telematic system, the requested personalized key from the mobile communication device in an encrypted form.

2. The method according to claim 1,
    where upon receipt of the request for the personalized key from the automotive telematic system, the mobile communication device runs an application for transmitting the requested personalized key to the automotive telematic system, the application run on a processing unit of the mobile communication device in an application layer; and
    where the encrypted form of the requested personalized key is generated by the processing unit in the application layer.

3. The method according to claim 1,
where establishing the connection between the mobile communication device and the automotive telematic system comprises automatically establishing a short-range wireless connection with the mobile communication device using a short-range wireless transceiver of the automotive telematic system.

4. The method according to claim 3, where establishing the short-range wireless connection comprises Secure Simple Pairing (SSP) of the mobile communication device and the automotive telematic system.

5. The method according to claim 1,
where establishing the connection between the mobile communication device and the automotive telematic system comprises establishing a Wi-Fi connection with a Wi-Fi transceiver of the mobile communication device using a Wi-Fi transceiver of the automotive telematic system.

6. The method according to claim 1, further comprising:
reading the requested personalized key from a storage unit included in a subscriber identity module (SIM) card of the mobile communication device;
where at least one personalized key has previously been stored on the storage unit.

7. The method according to claim 1,
where the telematic service is at least partly provided by an external provider; and
where determining that the personalized key for user authentication is required to access the telematic service comprises:
initiating a connection between the automotive telematic system and a remote server of the external provider;
sending a request to access the telematic service to the remote server; and
determining from a response received from the remote server that the personalized key for user authentication is required to access the telematic service.

8. The method according to claim 1, further comprising:
accessing the telematic service, which comprises accessing personalized data stored in an encrypted form on a storage unit of the automotive telematic system; and
where accessing the personalized data comprises decrypting the personalized data using the requested personalized key.

9. The method according to claim 1,
where the requested personalized key comprises a user identification and at least one of a passphrase or an encryption key.

10. The method according to claim 1,
where the requested personalized key is not stored by the automotive telematic system.

11. An automotive telematic system, adapted to be connected to a mobile communication device, comprising:
an input device configured to receive a request to access a telematic service from a user via user input; and
a processing unit configured to determine that a personalized key for user authentication is required to access the telematic service;
where in response to determination that the personalized key is required, the processing unit is further configured to request the personalized key from the mobile communication device, which is connected to the automotive telematic system; and
where the processing unit is further configured to perform communication with the mobile communication device in an encrypted form.

12. The automotive telematic system according to claim 11, further comprising:
a short-range wireless transceiver configured to automatically establish a short-range wireless connection to a short-range wireless transceiver of the mobile communication device;
where establishing the short-range wireless connection comprises Secure Simple Pairing (SSP) of the mobile communication device and the automotive telematic system.

13. The automotive telematic system according to claim 11,
where the telematic service is at least partly provided by an external provider;
where the automotive telematic system is further adapted to establish a connection to a remote server of the external provider, and to send a request to access the telematic service to the remote server via the connection; and
where the processing unit is further configured to determine from a response received from the remote server that the personalized key for user authentication is required to access the telematic service.

14. A non-transitory computer readable storage medium configured to store instructions executable by a processor, the computer readable storage medium comprising:
instructions executable by the processor to establish communications with a mobile communication device;
instructions executable by the processor to receive a request to access a telematic service of an automotive telematic system from a user via an input device of the automotive telematic system;
instructions executable by the processor to determine that a personalized key for user authentication is required to access the requested telematic service; and
instructions executable by the processor to, in response to determination that the personalized key is required, request the personalized key from the mobile communication device over the established communications.

15. The computer readable medium of claim 14, where the instructions executable by the processor to determine that the personalized key for user authentication is required comprises instructions executable by the processor to determine from information included with the request, whether the telematic service is at least partly provided by an external provider, and instructions to establish a connection between the automotive telematic system and a remote server of the external provider.

16. The computer readable medium of claim 14, where the mobile communication device is a first mobile communication device and the personalized key is a first personalized key, and the computer readable medium further comprises:
instructions executable by the processor to establish communications with a second mobile communication device;
instructions executable by the processor to receive another request to access the telematic service of the automotive telematic system, where the another request identifies the second mobile communication device; and
instructions executable by the processor to request a second personalized key from the second mobile communication device over the established communications.

17. The computer readable medium of claim 14, where the instructions to request the personalized key include instructions to select the mobile communication device to receive the request for the personalized key, based on information comprising a user identity included in the request to access the telematic service of the telematic system.

18. The computer readable medium of claim 14, further comprising instructions executable by the processor to generate an error signal absent receipt from the mobile communication device of the requested personalized key within a predetermined period of time.

* * * * *